(12) United States Patent
Shitamichi

(10) Patent No.: US 8,502,079 B2
(45) Date of Patent: Aug. 6, 2013

(54) GROMMET

(75) Inventor: Masaru Shitamichi, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 13/332,969

(22) Filed: Dec. 21, 2011

(65) Prior Publication Data

US 2012/0285727 A1    Nov. 15, 2012

(30) Foreign Application Priority Data

May 13, 2011    (JP) .................. 2011-108254

(51) Int. Cl.
*H01B 17/26*    (2006.01)

(52) U.S. Cl.
USPC ............ 174/152 G; 174/153 G; 174/650; 16/2.1; 16/2.2; 248/56

(58) Field of Classification Search
USPC ............ 174/152 G, 153 G, 137 R, 142, 151, 174/152 R, 153, 72 A, 650; 16/2.1, 2.2; 248/56
See application file for complete search history.

(56) References Cited

U.S. PATENT DOCUMENTS

| | | | |
|---|---|---|---|
| 6,442,794 B2 | 9/2002 | Uchida et al. | |
| 6,465,740 B2 | 10/2002 | Kondoh et al. | |
| 6,927,338 B2 * | 8/2005 | Shimola et al. | 174/152 G |
| 7,767,911 B2 | 8/2010 | Kawasaki et al. | |
| 8,089,002 B2 * | 1/2012 | Hasegawa | 174/153 G |
| 8,108,968 B2 * | 2/2012 | Pietryga et al. | 174/153 G |
| 8,299,364 B2 * | 10/2012 | Suzuki et al. | 174/152 G |
| 2010/0314158 A1 | 12/2010 | Suzuki et al. | |
| 2011/0073351 A1 | 3/2011 | Okuhara et al. | |

FOREIGN PATENT DOCUMENTS

| | | |
|---|---|---|
| JP | 07-042878 | 2/1995 |
| JP | 2008-234904 | 10/2008 |

* cited by examiner

*Primary Examiner* — Angel R Estrada
(74) *Attorney, Agent, or Firm* — Greenblum & Bernstein P.L.C.

(57) ABSTRACT

A grommet includes a wire passage supporting a wire harness, a pinch-grip, and a connector. The pinch-grip is fixable to a vehicle body panel by pinching a peripheral edge of the panel surrounding a through-hole. The connector has an annular shape having a curved portion recessed to an inner periphery, the recessed portion extending in a peripheral direction. One end of the connector is joined to the wire passage and the other end is joined to the pinch-grip.

6 Claims, 3 Drawing Sheets

GROMMET

CROSS-REFERENCE TO RELATED APPLICATIONS

The present application claims priority under 35 U.S.C. §119 of Japanese Application No. 2011-108254, filed on May 13, 2011, the disclosure of which is expressly incorporated by reference herein in its entirety.

BACKGROUND OF THE INVENTION

1. Field of the Invention

The present invention relates to a grommet mounted in a through-hole formed on a panel, such as on a vehicle body, such that the grommet is mounted over a wire harness.

2. Description of Related Art

Technology is known for a grommet being mounted over a wire harness, such as that described hereafter.

For example, Japanese Patent Laid-open Publication No. 2008-234904 discloses a grommet including a circular connector around the outer periphery of a central axis in which a wire harness has been inserted. A lip is stretchably joined to the circular connector in an axis-central direction and a flange is joined to the lip.

Japanese Patent Laid-open Publication No. H07-42878 discloses a grommet in which a central portion connects a large diameter portion and a small diameter portion along a central axis, the central portion having a corrugated shape.

However, the grommet disclosed in Japanese Patent Laid-open Publication No. 2008-234904 has a structure in which the through-hole of the body panel is pinched between the lip and the flange. Thus, when the path of the wire harness is skewed, due to a bend developing in the wire harness, for example, while the grommet is attached to the through-hole, portions of the lip in direct contact with the body panel through-hole are likely to deform. Accordingly, there is a risk that adhesion worsens between the lip or the flange and the peripheral edge of the body panel through-hole and that the seal will deteriorate.

The central portion of the grommet disclosed in Japanese Patent Laid-open Publication No. H07-42878 has a shape which is deformable such that an annular portion having a small diameter enters a neighboring annular portion having a large diameter. It is therefore unlikely to bend in a direction orthogonal to the axis direction. Thus, as described above, when the path of the wire harness is skewed, due to a bend developing in the wire harness, for example, force is likely to act on portions of the grommet fixed to the panel. Accordingly, there is a risk that this force will deform the portions of the grommet touching the panel and deteriorate the seal.

SUMMARY OF THE INVENTION

In view of the above issues, the present application provides a grommet able to inhibit deformation of a waterproofing portion, the waterproofing achieved by contact with a panel, such as on a vehicle body, as well as to achieve good waterproofing.

A first aspect of the invention is a grommet fixedly attached by insertion into a panel through-hole, the grommet being an elastic material through the interior of which a wire harness is passed. The grommet includes a harness support supporting the wire harness, a pinch-grip, and a connector. The pinch-grip is fixable to the panel by pinching a peripheral edge of the panel on which the through-hole is formed. The connector has an annular shape having a curved portion recessed to an inner periphery or an outer periphery, the recessed portion following a peripheral direction. One end side of the connector is joined to the harness support and the other end side is joined to the pinch-grip.

A second aspect of the invention is a grommet in which the connector has a curved portion recessed to an inner periphery, the recessed portion bending in a V-shape to the inner periphery on a cross-section following an extension direction of the wire harness.

A third aspect of the invention is a grommet in which the connector has a curved portion recessed to an inner periphery, the recessed portion bending in a U-shape to the inner periphery on a cross-section following an extension direction of the wire harness.

A fourth aspect of the invention is a grommet in which a projection is formed on either end side of the connector, the projection being elastically deformable such that it extends outward and overlays the annular recessed portion on the inner side of the connector.

According to the aspects of the invention, the harness support and the pinch-grip are connected by the connector. The connector has an annular shape having a curved portion recessed to an inner periphery or an outer periphery, the recessed portion following a peripheral direction. Therefore, when the wire harness supported by the harness support exerts force on a portion of the grommet, the connector is deformed and the force acting on the pinch-grip is alleviated, the pinch-grip pinching the panel to fixedly attach it. Accordingly, deformation of the pinch-grip is inhibited and it is thus possible to improve the waterproofing property of the grommet.

According to the second aspect in particular, the connector has a curved portion recessed to an inner periphery, the recessed portion bending in a V-shape to the inner periphery on a cross-section following an extension direction of the wire harness. Thus, when force from the harness support acts on the connector, the connector deforms such that the bent angle in a given portion is decreased and the bent angle in a different portion is increased. The force on the pinch-grip is accordingly alleviated, the pinch-grip pinching the panel to fixedly attach it.

According to the third aspect in particular, the connector has a curved portion recessed to an inner periphery, the recessed portion bending in a U-shape to the inner periphery on a cross-section following an extension direction of the wire harness. Thus, when force from the harness support acts on the connector, the connector deforms such that the width of the opening edge of the U-shape in a given portion is reduced and the width of the opening edge of the U-shape in a different portion is increased. The force on the pinch-grip pinching the panel to fixedly attach it is accordingly alleviated.

According to the fourth aspect in particular, a projection is formed on either end side of the connector, the projection being elastically deformable such that it extends outward and overlays the annular recessed portion on the inner side of the connector. Accordingly, when the grommet is inserted in the through-hole of the panel, the wire harness having been passed through the interior of the grommet, the projection makes contact with the peripheral edge of the panel on which the through-hole is formed. The projection is able to then elastically deform and to overlay the annular recessed portion on the inner side of the connector. This limits the peripheral edge of the panel on which the through-hole is formed from being fixedly attached by the annular recessed portion of the connector.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereafter, embodiments of the present invention will be explained with reference to the enclosed figures. The following embodiments are specific examples of the present invention and do not limit the technological scope of the invention.

First Embodiment

Figure 1:
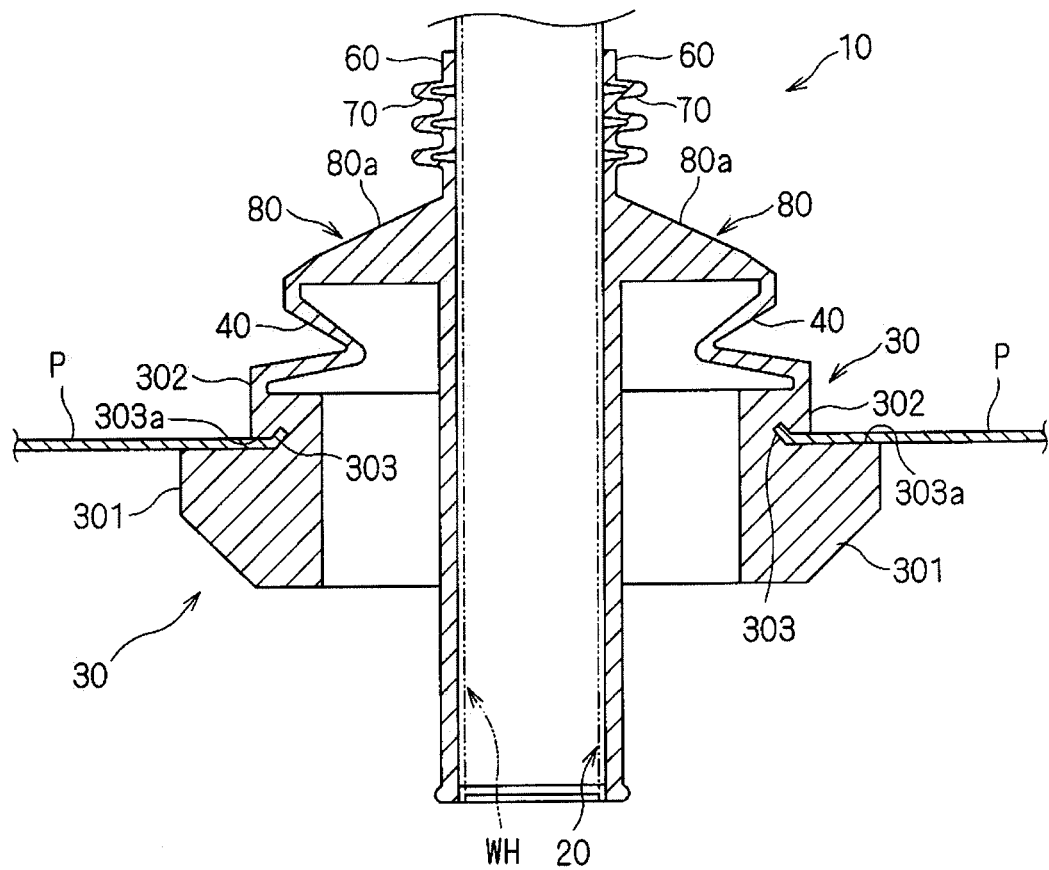
FIG. 1 is a cross-sectional view of a grommet according to a first embodiment of the present invention.

FIG. 1 is a cross-sectional view of a grommet 10 according to a first embodiment of the present invention.

The grommet 10 has a resin structure integrally molded from any suitable elastic material, such as synthetic rubber. The grommet 10 is inserted into and fixated in a through-hole formed in a vehicle body panel P of a vehicle such as an automobile, such that the grommet 10 is mounted over a wire harness WH.

In the interior of the grommet 10, a wire passage 20 is provided as a portion through which the wire harness WH is inserted. The wire passage 20 according to the present embodiment has a shape allowing housing of the wire harness WH which is positioned so as to be straight. Each portion of the grommet 10 is provided contiguously around the wire passage 20.

A tape-wound portion 60 at which tape is wound around the wire housing WH and the grommet 10 is provided around one end of the wire passage 20 disposed on the outer side of a vehicle body panel P. The wire harness WH is positioned with respect to the grommet 10 by winding tape at the tape-wound portion 60. The wire passage 20 corresponds to the harness support in the present embodiment.

The tape-wound portion 60 may also be provided on the other end of the wire passage 20, specifically the end disposed on the inner side of the vehicle body panel P, and may also be provided on both ends of the wire passage 20.

A corrugated portion 70 is joined to the tape-wound portion 60 and a connector 80 is further joined to the corrugated portion 70.

The connector 80 has an annular shape following a peripheral direction with the wire passage 20 at its center. The connector 80 has a curved portion recessed to an inner periphery, the recessed portion following the peripheral direction. In the present embodiment, the curved portion recessed to the inner periphery bends in a V-shape to the inner periphery on a cross-section following an extension direction of the wire harness WH (sometimes referred to hereafter as a "longitudinal section"). Hereafter, this portion bent into a V-shape is referred to as a stretching portion 40.

The stretching portion 40 is provided between an outer peripheral edge of an annular connector 80a on the connector 80 and an outer peripheral edge of the end face on the annular connector 80a side on a pinch-grip 30, the annular connector 80a protruding outward from the wire passage 20. The stretching portion 40 bends on the inner periphery toward the pinch-grip 30 from the outer peripheral edge of the annular connector 80a. The stretching portion 40 also folds back to the outer periphery at the V-shaped bend and is thus connected to the outer peripheral edge of the pinch-grip 30. The stretching portion 40 also bends on the inner periphery toward the annular connector 80a at the connection between the stretching portion 40 and the outer peripheral edge of the pinch-grip 30.

The stretching portion 40 may also have a structure projecting to an outer periphery. That is, the stretching portion 40 may be a curved portion recessed to an outer periphery, the recessed portion following a circumferential direction. The stretching portion 40 may also be bent on its longitudinal section without limitation to a V-shape.

The pinch-grip 30 is provided contiguously to the connector 80. The pinch-grip 30 is a portion which fixedly attaches the grommet 10 to the vehicle body panel P by pinching the peripheral edge of the vehicle body panel P on which a through-hole is formed (sometimes referred to hereafter as the through-hole edge). The pinch-grip 30 includes, in order, a pincher 302, a neck 303, and a base 301. Because barring is performed on the through-hole edge, the tip of the through-hole edge is folded outward.

The pincher 302 is a portion positioned on the outer side of the vehicle body panel P when the grommet 10 is mounted in the through-hole. The pincher 302 pinches the through-hole edge along with the base 301 described below. Specifically, a concavity 303a is formed in an annular shape on the outer periphery of the pinch-grip 30 and the through-hole edge is engaged in the concavity 303a. The portions framing the concavity 303a are the pincher 302 and the base 301 and, specifically, the portion forming the concavity 303a between them is the neck 303. As shown in FIG. 1, the pincher 302 is thicker as compared to the thickness of the stretching portion 40. Therefore, even if the stretching portion 40 is bent, it is not likely to affect the pincher 302.

The vehicle body panel P is fixedly attached with respect to the grommet 10 by the neck 303. Specifically, the position at which the through-hole edge engages the neck 303 corresponds to a properly engaged position which fixedly attaches the grommet 10 to the vehicle body panel P and which also is able to achieve good waterproofing between the grommet 10 and the vehicle body panel P.

The base 301 is a portion whose size when viewed from a face along an axis-direction of the wire harness is larger than the through-hole. Therefore, the through-hole edge set in the properly engaged position contacts a surface of the base 301. The surface of the base 301 includes an annular lip which is not depicted in the figures. This lip contacts a surface of the vehicle body panel P. In this way, the through-hole engages with the neck 303, and the base 301 and the pincher 302 frame the face of the through-hole edge. Accordingly, the grommet 10 is fixedly attached with respect to the vehicle body panel P.

What follows is a description of the operation of mounting the grommet 10 into the through-hole of the vehicle body panel P, the grommet 10 fixating the wire harness WH.

First, the wire harness WH is inserted in the wire passage 20 of the grommet 10. With the wire harness WH inserted in the grommet 10, tape is wound over the grommet 10 and the wire harness WH at the tape-wound portion 60. The wire harness WH inserted within the grommet 10 is thus fixated with respect to the grommet 10.

Figure 2:
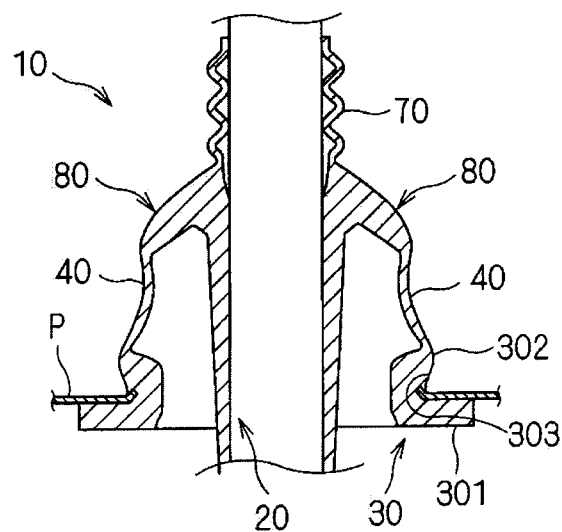
FIG. 2 is a cross-sectional view showing an exemplary deformed state of the grommet according to the first embodiment.

FIG. 2 shows the shape of the grommet 10 during insertion into the through-hole. The grommet 10 is inserted in the through-hole in sequence beginning with the tape-wound portion 60, the grommet 10 facing outward from the inner side of the vehicle body panel P. The pincher 302 is larger than the through-hole. However, because the grommet 10 is formed from elastic material, the through-hole is able to pass over the pincher 302 by contracting the pincher 302 toward the center of the wire passage 20 while performing the insertion operation.

In this way, when the grommet 10 is inserted into the through-hole, the stretching portion 40 extends and spreads out in the axis direction. Therefore, the through-hole edge easily engages with the neck 303, rather than with the inward concavity of the stretching portion 40. Specifically, it is possible to inhibit the vehicle body panel P from being fixedly attached by the concavity on the stretching portion 40, which is not the properly engaged position.

In the first embodiment, because the stretching portion 40 protrudes in an annular shape on the inner periphery, when the grommet 10 is inserted into the through-hole, this portion is inhibited from interfering with the through-hole edge and causing problems in the insertion operation.

When the through-hole is engaged in the properly engaged position, tensile force in the extension direction of the wire harness WH is released. In addition, one face of the through-hole edge is engaged with the surface of the base 301 and the other face is engaged with the face of pincher 302. The grommet 10 is thus mounted into the vehicle body panel P.

Figure 3:
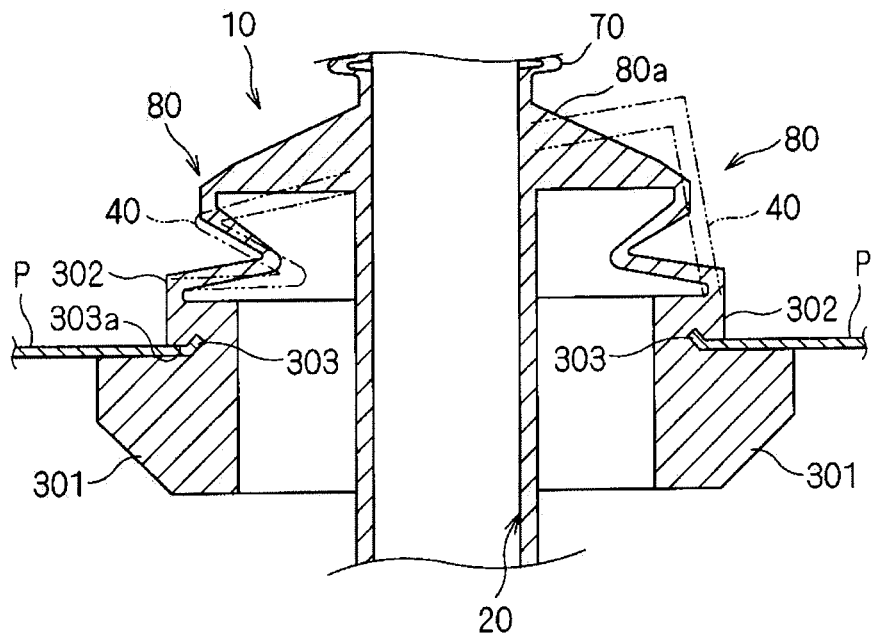
FIG. 3 is a cross-sectional view showing an exemplary deformed state of the grommet according to the first embodiment.

FIG. 3 shows the shape of the stretching portion 40 when the path of the wire harness WH fixated by the grommet 10 is skewed in an oblique direction from a position following the wire passage 20, the skew resulting from the wire harness WH being bent while being pulled from the outside, or the like. The shape of the post-deformation stretching portion 40 is shown in a two-dot-dashed line.

The portion of the grommet 10 in contact with the wire harness WH receives force from the wire harness WH in a direction following the curve direction of the wire harness WH due to the skewing of the path of the portion of the wire harness WH outside the vehicle body panel P. In the present embodiment, the tape-wound portion 60 corresponds to the above portion and thus the force acts on the tape-wound portion 60.

The wire passage 20 having the tape-wound portion 60 is joined to the connector 80. Accordingly, the force arising from the skewing of the wire harness WH acts on a portion of the stretching portion 40 in a direction from the forward-end side to the base-end side, the stretching portion 40 being a portion of the connector 80 joined to the wire passage 20. Receiving this force, the stretching portion 40 bends such that the bent-back portion of the stretching portion 40 is pinched, reducing the angle of the V-shape and recessing toward the inner periphery. That is, the stretching portion 40 is deformed on the longitudinal section, the edge of the stretching portion 40 on the forward-end side approaching the edge of the stretching portion 40 on the base-end side, such that the bent angle of the stretching portion 40 is decreased (see the two-dot-dashed line shape on the left side of FIG. 3). At this time, both bent portions of the stretching portion 40 on the annular connector 80a side and the pinch-grip 30 side are deformed such that the bent angle of the stretching portion 40 is decreased.

On the other hand, on the portion of the stretching portion 40 opposite to the portion of the stretching portion 40 with both edges approaching in this way, in response to the movement of the two edges approaching as described above, the stretching portion 40 deforms such that the bent angle of the stretching portion 40 spreads to its largest extent. At this time, both bent portions of the stretching portion 40 on the annular connector 80a side and the pinch-grip 30 side are deformed such that the bent angle of the stretching portion 40 is increased. That is, the bent-back portion of the stretching portion 40 is pinched, creating a further widened V-shape between the edge of the forward-end side and the edge of the base-end side (see the two-dot-dashed line shape on the right side of FIG. 3).

In this way, the stretching portion 40 deforms, extending and contracting in response to the skewing of the wire harness WH. Accordingly, the force applied on the grommet 10 by the skewing of the wire harness WH is likely to be absorbed by the stretching portion 40.

The edge of the base-end side of the stretching portion 40 is joined to the pincher 302 on the pinch-grip 30. As described above, the pincher 302 is thicker than the edge of the base-end side of the stretching portion 40. Accordingly, the pincher 302 is not likely to be affected by deforming or the like, regardless of how much force is received from the edge of the base-end side of the stretching portion 40.

As described above, in the grommet 10 according to the present embodiment, the wire passage 20 and the pinch-grip 30 are connected by the connector 80. The connector 80 has an annular shape having a curved portion recessed to an inner periphery, the recessed portion following the circumferential direction. For this reason, when the wire harness WH supported by the tape-wound portion 60 transfers force to one portion of the grommet 10, since the curved portion recessed to an inner periphery (the stretching portion 40 in the embodiment described above) deforms, the force acting on the pinch-grip 30 is alleviated, the pinch-grip 30 pinching the panel to fixedly attach it. Therefore, because the deformation of the pinch-grip 30 is inhibited, it is possible to achieve good waterproofing with the grommet 10.

Second Embodiment

Figure 4:
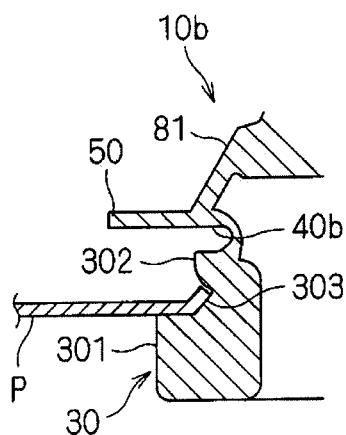
FIG. 4 is a partial cross-sectional view of the grommet according to a second embodiment of the present invention.

The grommet 10 of the present invention is not limited to the first embodiment described above. It may also have other forms. FIG. 4 shows a partial cross-sectional view of a grommet 10b according to a second embodiment. The same reference numerals are assigned to portions that are the same as the grommet 10 according to the first embodiment described above, and the explanation thereof is omitted.

A connector 81 according to the present embodiment has an annular shape having a curved portion recessed to an inner periphery, the recessed portion following the circumferential direction. In the present embodiment, this portion is called a stretching portion 40b. The stretching portion 40b curves such that it recesses to an inner periphery, bending in a U-shape to the inner periphery on a longitudinal section. That is, the stretching portion 40b bends such that the width of the opening edge of the recessed portion either increases or decreases.

The grommet 10b according to the present embodiment further includes a projection 50 extending outward. In the present embodiment, the projection 50 is provided on the connector 81 on the end portion of the side connected to the wire passage 20 around the periphery of the opening edge of the stretching portion 40b. However, depending on the insertion direction of the grommet 10b into the through-hole, the projection 50 may also be provided on the end portion of the connector 81 on the pinch-grip 30 side. When either the wire passage 20 or the pinch-grip 30 is close to the connector 81, the projection 50 may be provided on the wire passage 20 or the pinch-grip 30, respectively. That is, the projection 50 may be provided on either end side of the connector 81.

In the present embodiment, the projection 50 has a length in an extension direction, which is at least the sum of a length and a breadth, the length being the length running from the disposed position of the projection 50 to the opening edge of the stretching portion 40b on the forward-end side and the breadth being the breadth of the opening edge of the stretching portion 40b. In the present embodiment, the face of the base-end side of a projection 50 and the face of the forward-end side of the stretching portion 40b are disposed on a single plane. The length of the projection 50 is thus substantially the same as the breadth of the opening edge of the stretching portion 40b. The projection 50 is elastically deformable and also has the above-noted length. Therefore, the projection 50 is able to overlay the entire opening of the recessed portion of the stretching portion 40b by elastically deforming.

However, when the projection 50 is elastically deformed so as to overlay the opening of the stretching portion 40b, it is preferable that the degree of projection not be able to overlay the concavity 303a, i.e., that the degree of projection be smaller than the length running from the disposed position of the projection 50 to the concavity 303a. Here, too, an example is described in which the projection 50 is set at such a degree of projection.

Figure 5:
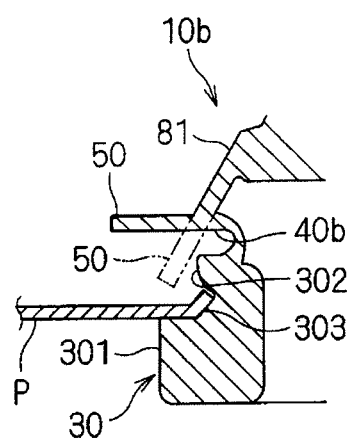
FIG. 5 is a cross-sectional view showing an exemplary deformed state of a part of the grommet according to the second embodiment.

A description follows, utilizing FIG. 5, of the operation of mounting the grommet 10b into the through-hole, the grommet 10b fixating the wire harness WH.

The grommet 10b is inserted into the through-hole, the wire harness WH being fixated to the grommet 10b by the tape-wound portion 60. At this point, because the projection 50 extends outward in an annular shape, during the process of inserting the grommet 10b into the through-hole, the projection 50 contacts the through-hole edge and is pushed in while elastically deforming along the outer peripheral face of the body of the grommet 10b. Accordingly, the projection 50 is temporarily in a position overlaying the opening of the stretching portion 40b and not overlaying the concavity 303a. While this position is maintained, the through-hole edge contacts the outer face of the projection 50, which has been elastically deformed, and is engaged in the concavity 303a of the pinch-grip 30. The insertion of the grommet 10b into the through-hole is thus performed and the vehicle body panel P engages with the grommet 10b in a properly engaged position. The grommet 10b is thus mounted into the through-hole formed on the vehicle body panel P, the grommet 10b fixating the wire harness WH.

Figure 6:
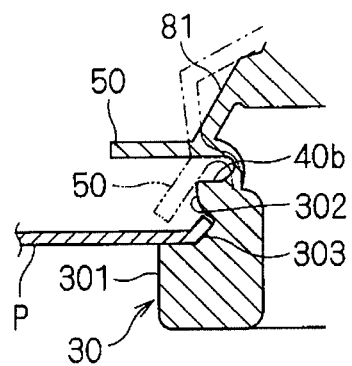
FIG. 6 is a cross-sectional view showing an exemplary deformed state of a part of the grommet according to the second embodiment.

Similarly to the first embodiment and making use of FIG. 6, a situation is described in which skewing in the path of the wire harness WH arises and the wire harness WH transfers force to the grommet 10b. When the grommet 10b receives the force, a given portion of the stretching portion 40b deforms by bending such that the breadth of the opening edge of the U-shape in the stretching portion 40b decreases (see the dotted line shape in FIG. 6). A different portion of the stretching portion 40b deforms by bending such that the breadth of the opening edge of the stretching portion 40b increases. In this way and similarly to the first embodiment, because the grommet 10b includes the stretching portion 40b, the grommet 10b deforms by extending and contracting in response to the force it receives. Therefore, the force acting on the grommet 10b due to skewing of the wire harness WH is likely to be absorbed by the stretching portion 40b.

As above, the grommet 10b according to the present embodiment includes the stretching portion 40b. For this reason, as with the grommet 10, the stretching portion 40b deforms when the wire harness WH transfers force to a portion of the grommet 10b, and the force acting on the pinch-grip 30 is alleviated. Therefore, the pinch-grip 30 is not deformed and the grommet 10b is able to achieve good waterproofing.

Furthermore, when attaching into the through-hole, the grommet 10b includes the projection 50 which is elastically deformable so as to block the opening of the stretching portion 40b. Therefore, when attaching the grommet 10b into the through-hole, engagement of the edge of the vehicle body panel P with the concavity of the stretching portion 40b is inhibited.

Alternative Examples

The present invention is not limited to the above-described embodiments. For example, the projection 50 may be provided on the grommet 10 of the first embodiment described above. Specifically, the projection 50 may be provided on either end-side of the connector 80 which is provided on the grommet 10.

In addition, the projection 50 may be provided on the curved recessed portion provided on the connector. Specifically, the projection 50 may be provided on a grommet having a structure in which a stretching portion projects outward.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A grommet formed of an elastic material, through which a wire harness is passed, the grommet configured to be fixedly attached by insertion into a panel through-hole, the grommet comprising:
   a harness support supporting a wire harness;
   a pinch-grip fixable to the panel by pinching a peripheral edge of the panel surrounding the through-hole; and a connector with an annular shape having a curved portion recessed to an inner periphery or an outer periphery, the recessed portion extending in a peripheral direction, one end of the connector being joined to the harness support and the other end being joined to the pinch-grip;

the harness support extending through the connector from said one end past said other end and the pinch-grip, such that the harness support is configured to extend outside the vehicle body panel to support the wire harness and follow a curve of the wire harness.

2. The grommet according to claim 1, wherein the curved portion of the connector is recessed to an inner periphery, the recessed portion bending in a V-shape to the inner periphery on a cross-section along an extension direction of the wire harness.

3. The grommet according to claim 1, wherein the curved portion of the connector is recessed to an inner periphery, the recessed portion bending in a U-shape to the inner periphery on a cross-section along an extension direction of the wire harness.

4. The grommet according to claim 1, wherein a projection is provided on either end of the connector, the projection being elastically deformable so as to extend outward and overlay the recessed portion.

5. The grommet according to claim 2, wherein a projection is provided on either end of the connector, the projection being elastically deformable so as to extend outward and overlay the recessed portion.

6. The grommet according to claim 3, wherein a projection is provided on either end of the connector, the projection being elastically deformable so as to extend outward and overlay the recessed portion.

* * * * *